May 16, 1950     L. OLSEN-TANK     2,507,927
DEVICE FOR HOLDING RECORD FORMS FOR
SIMULTANEOUS ENTRY

Filed Aug. 11, 1948     3 Sheets-Sheet 1

INVENTOR
*Leif Olsen-Tank*
BY
*Clark & Ott*
ATTORNEYS

May 16, 1950  L. OLSEN-TANK  2,507,927
DEVICE FOR HOLDING RECORD FORMS FOR
SIMULTANEOUS ENTRY
Filed Aug. 11, 1948  3 Sheets-Sheet 2

INVENTOR
LEIF OLSEN-TANK
BY
Clark & Ott
ATTORNEYS

May 16, 1950     L. OLSEN-TANK     2,507,927
DEVICE FOR HOLDING RECORD FORMS FOR
SIMULTANEOUS ENTRY
Filed Aug. 11, 1948     3 Sheets-Sheet 3
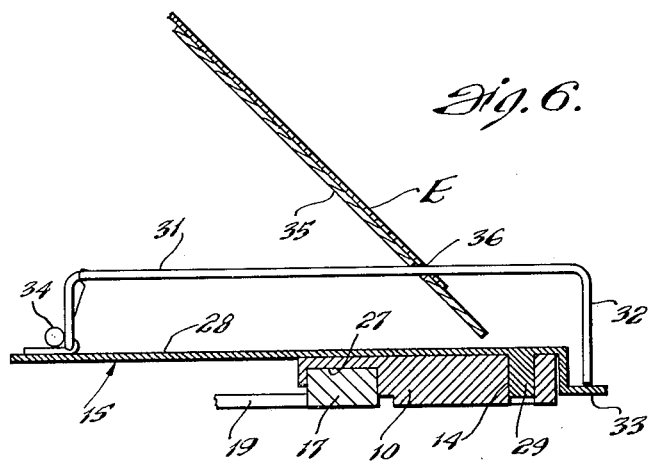
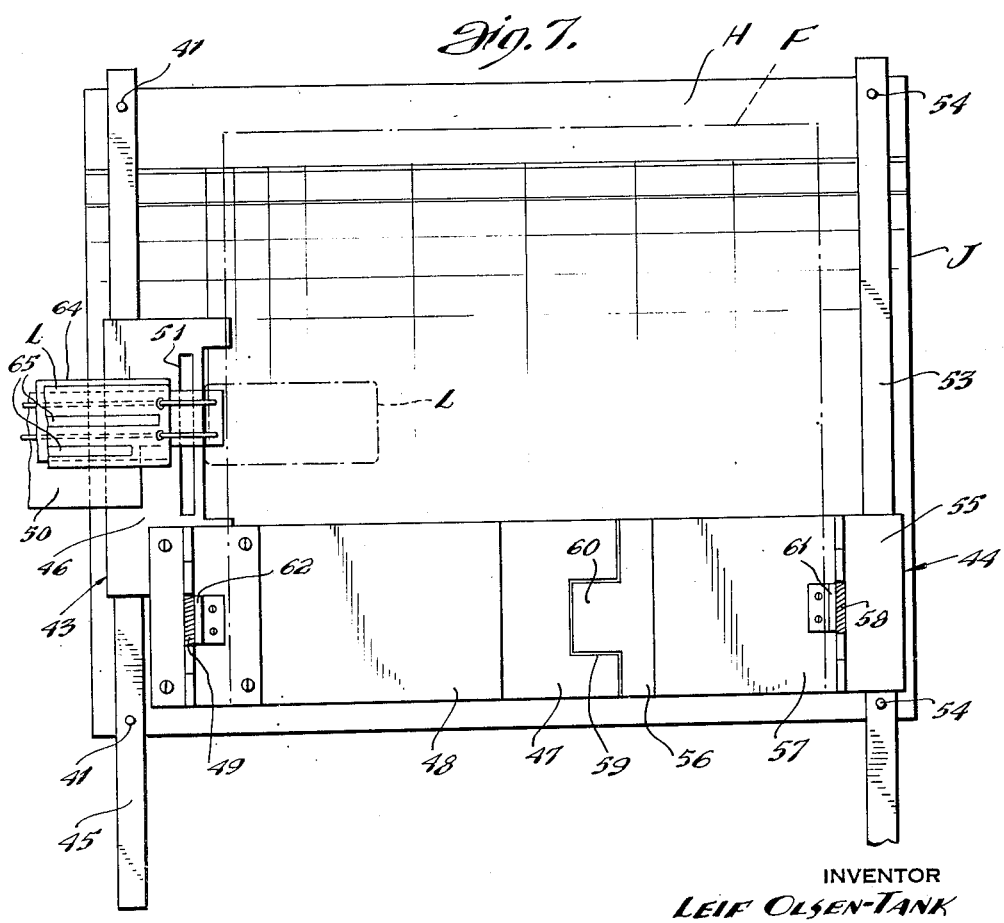
INVENTOR
*LEIF OLSEN-TANK*
BY
*Clark & Ott*
ATTORNEYS Patented May 16, 1950

2,507,927

UNITED STATES PATENT OFFICE 2,507,927

DEVICE FOR HOLDING RECORD FORMS FOR SIMULTANEOUS ENTRY

Leif Olsen-Tank, Brooklyn, N. Y.

Application August 11, 1948, Serial No. 43,648

7 Claims. (Cl. 282—29)

This invention relates generally to bookkeeping systems and has particular reference to a device for facilitating the simultaneous posting on several record forms in one operation.

The invention provides a device for holding original and final record forms as well as vouchers, bills, receipts and the like in superimposed relation for the making out of the latter forms and the simultaneous posting of the entries on the original and final record forms.

Another object of the invention is the provision of a device of said character having a slide bar adapted for holding an original record form together with a voucher, bill, receipt and the like in superimposed relation upon a ledger sheet and for movement of the original record form and vouchers, bills, receipts and the like to dispose the same in the desired location on the ledger sheet for posting the entries on the ledger sheet and original record form with the making out of the vouchers, bills, receipts and the like.

Another object of the invention is the provision of a device of said character adapted to be applied to a loose-leaf ledger to dispose a slide bar at one side of the ledger sheet for movement of the bar longitudinally of a side edge thereof and which bar is provided with fixed and hinged plates arranged longitudinally of the lines of the ledger sheet for holding an account sheet or other form together with carbon paper in projected relation over the ledger sheet.

Still another object of the invention is the provision of means for releasably holding vouchers, bills, receipts and the like for movement thereof toward and away from the upper edges of the fixed and hinged plates so as to dispose the same in overlying relation with reference to the projected portions of the account sheet and carbon paper secured in position by said plates.

Still another object of the invention is the provision of oppositely disposed interengaging devices of the indicated character adapted to be positioned adjacent the opposite side edges of a flat support for holding record forms together with carbon paper in overlying relation with a ledger sheet arranged on said support and which is adapted for movement of the record forms to dispose the same in any desired location on the ledger sheet.

With the foregoing and other objects in view, reference is now made to the following specification and accompanying drawings in which the preferred embodiments of the invention are illustrated.

In the drawings:

Fig. 6 is an enlarged fragmentary sectional view taken approximately on line 6—6 of Fig. 1.

Fig. 7 is a plan view of a modified form of device for facilitating the simultaneous posting of entries on record forms constructed in accordance with the invention and which is illustrated in position on a board.

Fig. 8 is a view looking towards the lower edge of the board.

Figure 1:
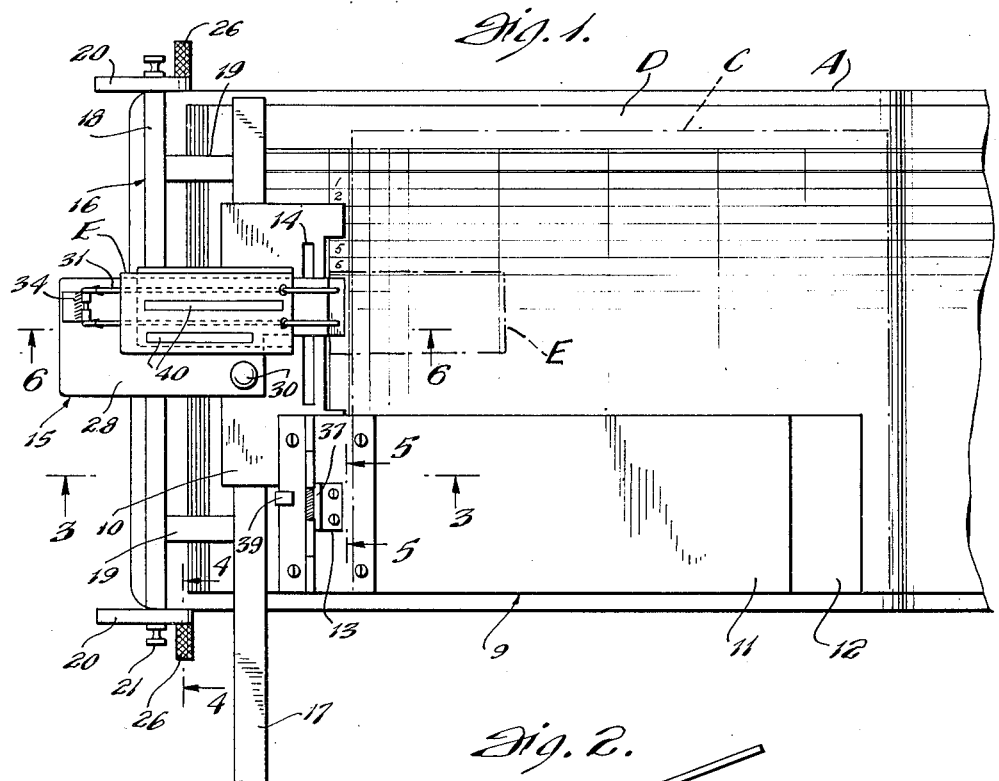
Fig. 1 is a plan view of a device for facilitating simultaneous posting of entries on record forms which is constructed in accordance with the invention and shown in position on a loose-leaf ledger which is partly broken away.

Referring to the drawings by characters of reference, the device consists of a holder for retaining and positioning account sheets and vouchers, bills, receipts and the like in overlying relation on a ledger sheet together with carbon paper for simultaneously posting entries on the ledger and account sheets with the making out of the vouchers, bills, receipts and the like.

The holder indicated generally by the reference character 9 is adapted to be secured to the binder A of a loose-leaf ledger so as to dispose a sheet of carbon B together with an account sheet C in overlying relation with a sheet D of the ledger and with a voucher, bill or receipt and the like indicated by the reference character E in overlying relation with the account sheet C.

The holder 9 includes a slide bar 10 having upper and lower plates 11 and 12 located adjacent the lower end thereof and projecting outwardly therefrom in right angular relation therewith and with the lower plate 12 affixed to the slide bar and the upper plate 11 hinged thereto by a tension hinge 13 for swinging movement of said hinged plate from tensioned position against the lower plate for holding a sheet of carbon paper B and the account sheet C therebetween to upwardly projected relation for removing the carbon paper and account sheet. The slide bar 10 is formed with a longitudinally extending slot 14 in which a support 15 for vouchers, bills, receipts E and the like is slidably arranged for movement thereof toward and away from said fixed and hinged plates.

The slide bar 10 is adapted to be arranged upon the ledger sheet D adjacent one edge thereof for movement of said slide bar longitudinally of an edge thereof to dispose the fixed and hinged plates in longitudinal alignment with the lines on said ledger sheet. In order to retain the slide bar in position on the ledger sheet D and to permit of swinging movement of the holder so as to elevate the same to thereby render it possible to turn the leaves of the ledger, a frame 16 is provided which consists of inner and outer bars 17 and 18 connected together in parallel relation by short bars 19 and having slotted links 20 pivoted to the outer ends of the outer bar 18 by studs 21 extending through the slots in the links. The links are provided with aligned inwardly directed trunnions 22 which are adapted to engage in openings 24 in the upper and lower edges of the binder A for pivotally connecting the frame thereto. Each of the trunnions 22 is engaged by a spring 25 for retaining the same in inwardly projecting relation and which is adapted to be released by the outward movement of the head 26 against the tension of the spring 25 for freeing the trunnion from the opening in the binder so as to permit of removal of the holder therefrom. The studs 21 threadedly engage in openings in the ends of the outer bars 18 whereby the studs may be tightened to rigidly secure the links thereto and to retain the holder on the leaf of the ledger.

The inner bar 17 of said frame projects beyond the lower edge of the ledger and engages in a longitudinally extending groove 27 in the under side of the slide bar 10 to permit of guided sliding movement of said slide bar longitudinally of the inner bar 17 whereby the carbon paper B and the account sheet C may be arranged in overlying relation with any portion of the ledger sheet D.

The support 15 for the vouchers, bills, receipts and the like consists of a plate 28 arranged upon the upper face of the slide bar 10 to project outwardly therefrom in a direction opposite to the fixed and hinged plates 11 and 12. The plate 28 is provided with a depending tongue 29 slidably fitted in the slot 14 in the slide bar so as to permit of movement of said support longitudinally of the bar between the plates 11 and 12 and the upper end of the slide bar. A handle member 30 is affixed to the plate 28 for facilitating the manipulation of the support and hinged to the upper face of said plate are parallel fingers 31 having downwardly directed free outer ends 32 adapted to seat on the inwardly directed stepped portion 33 thereof. The fingers 31 are tensioned by a coiled spring 34 adjacent the hinge connection for normally retaining the fingers in downwardly tensioned relation.

The fingers 31 are adapted to be swung upwardly on their pivotal connection for disposing the ends 32 thereof for receiving vouchers, bills, receipts and the like which are formed with openings for engagement of the ends 32 of the fingers therethrough. As illustrated in Figs. 1 and 6 of the drawings, a voucher E and the like is disposed in position on the fingers 31 in an out-of-the-way position after the form has been made out and the entries thereon transmitted to the account sheet C and the ledger sheet D. In this position, the voucher E is supported upon a metal plate 35 having openings 36 for slidably mounting the same on the fingers 31 and which openings are of a size to retain the plate 35 in an inclined position on the fingers. The voucher E is provided with one or more carbon areas 40 on the under side thereof in order that the data or information applied to the voucher when making out the same will be simultaneously entered on the account sheet C.

Figure 2:
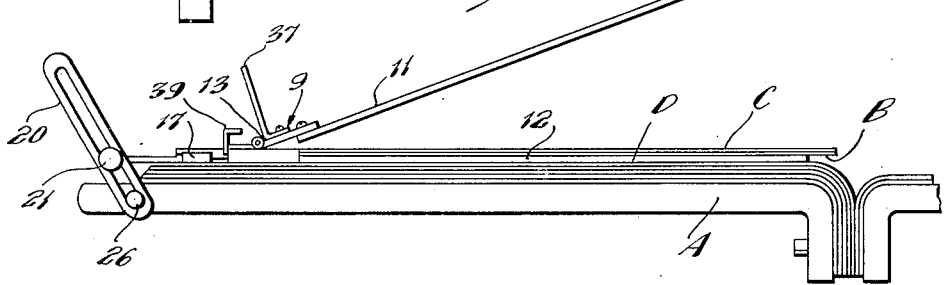
Fig. 2 is a view looking towards the bottom edge of the ledger.
Figure 3:
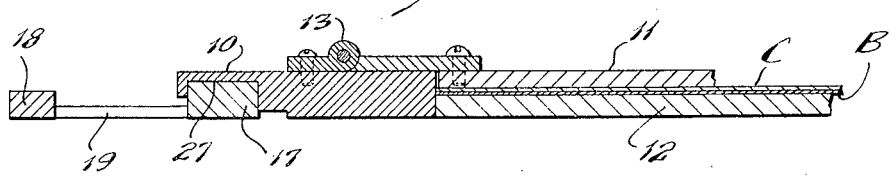
Fig. 3 is an enlarged fragmentary vertical sectional view taken approximately on line 3—3 of Fig. 1 with the ledger omitted.
Figure 3:
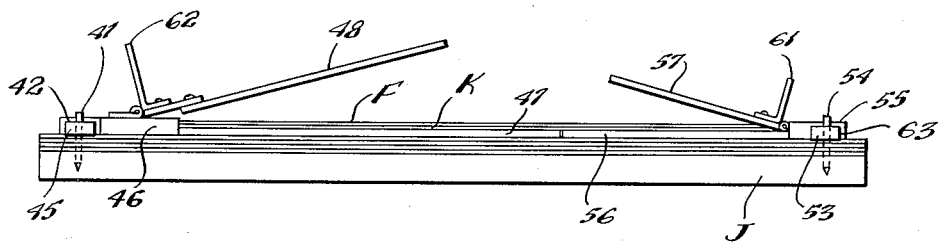
Figure 4:
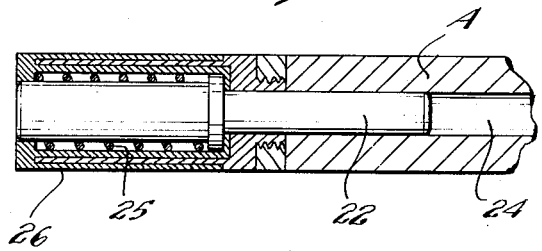
Fig. 4 is an enlarged fragmentary sectional view taken approximately on line 4—4 of Fig. 1.
Figure 5:
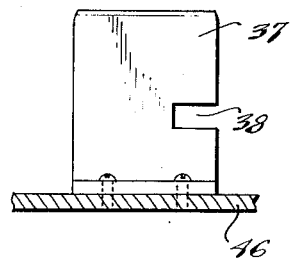
Fig. 5 is an enlarged fragmentary sectional view taken approximately on line 5—5 of Fig. 1.

The hinged plate 11 is provided with an upwardly extending projection 37 adjacent the hinge 13 adapted to be grasped by hand for swinging the hinged plate into upwardly projecting relation as illustrated in Fig. 2 of the drawings to facilitate the emplacement of the account sheet C and carbon paper B on the fixed plate 12 or the removal of the same therefrom. The projection 37 is provided with a notch 38 adapted to receive a spring clip 39 for retaining the hinged plate 11 in upwardly projecting relation.

In use and operation the holder is arranged on a ledger sheet in which entries of account are to be made and a sheet of carbon paper B is positioned on the fixed plate 12 with the upper portion of the carbon paper disposed in projecting relation beyond the upper edge of the said plate. An account sheet C is disposed in overlying relation upon the carbon paper and the hinged plate 11 is then released so that the spring tension thereof will retain the same in downwardly tensioned relation to hold the carbon paper and account sheet in position on the fixed plate 12. The vouchers, bills, receipts and the like which are to be made out are then attached to the support 15 by engagement of the free ends of the fingers 31 through the openings therein, after which the slide bar 10 is moved on the bar 17 to dispose the carbon paper and account sheet C in the desired position on the ledger sheet D and when so arranged, the support 15 is adjusted longitudinally of the slide bar 10 to dispose the vouchers, bills, receipts and the like in the desired position on the projected portion of the account sheet C so that when the vouchers, bills, receipts and the like are made out the entries thereon will be transmitted to the account sheet and to the ledger sheet.

In the form of the invention illustrated in Figs. 7 and 8 of the drawings, the device consists of oppositely disposed holders 43 and 44 for retaining and positioning an account sheet F held by both and a voucher, bill, receipt L or the like in overlying relation on a large ledger sheet H arranged on a board J together with a sheet of carbon paper K for posting the entries on the ledger sheet with the making out of the voucher, bill, receipt or the like. The ledger sheet H is relatively larger than the ledger sheet D employed in the previous form of the invention and in order to render it possible to post entries on different portions of the large ledger sheet H the holders 43 and 44 are arranged adjacent the opposite side edges thereof with an account sheet retained in position by each of the holders and with the voucher, bill, receipt or the like disposed in overlying relation with one of the account sheets.

The holder 43 consists of a retaining bar 45 having downwardly directed sharpened prongs 41 adjacent the opposite ends thereof for piercing the ledger sheet H and for engaging in openings in the board J adjacent the top and bottom thereof to thereby secure the holder upon the ledger sheet adjacent one side thereof. Mounted on the retaining bar 45 for longitudinal movement thereon is a slide bar 46 having an inwardly directed plate 47 rigidly affixed to the lower end thereof and a hinged plate 48 hinged thereto by a tension hinge 49 for movement thereof from a position in tensioned relation against the fixed plate to an upwardly projecting relation similar to the construction and arrangement of the slide bar 10 and the fixed and hinged plates 11 and 12 in the previous form of the invention. In this form of the invention the slide bar 46 is also formed with a longitudinally extending groove 42 in the under face thereof adapted to slidably fit the retainer bar 45 for movement of said slide bar together with the fixed and hinged plates 47 and 48 longitudinally of the retaining bar and to hold the sheet of carbon paper K together with the account sheet F between the fixed plate 47 and hinged plate 48 with the upper portions of said carbon paper and account sheet projecting beyond the upper edges thereof and in overlying relation with the ledger sheet H.

The slide bar 46 is also provided with a support 50 for vouchers, bills, receipts and the like similar to the support 15 in the previous form of the invention and as illustrated the support 50 is slidable in a longitudinally extending slot 51 in the slide bar 46 for movement of the support together with the vouchers, bills, receipts and the like over the projecting portion of the account sheet F.

The holder 44 also consists of a retaining bar 53 having downwardly projecting sharpened prongs 54 adjacent the opposite ends thereof for piercing the ledger sheet H and engaging in openings in the board J in oppositely disposed relation from the holder 37. The holder 44 is also provided with a slide bar 55 having a plate 56 secured thereto adjacent the lower end thereof and in overlying relation therewith is a hinged plate 57 adapted to receive the sheet of carbon paper K together with the account sheet F between said fixed and hinged plates with the upper portions of said sheets projecting beyond the upper edge of said plates and in overlying relation with the ledger sheet H.

The slide bar 55 is provided with a longitudinally extending groove 63 in the under face thereof adapted to slidably fit the retainer bar 53. The fixed plate 47 of the holder 43 and the fixed plate 56 of the holder 44 are respectively provided with a rectangular recess 59 and a tongue 60 which are adapted to interengage for movement of the holders 43 and 44 together along the retainer bars 45 and 53. The hinged plate 48 of the holder 43 is formed with an upwardly extending projection 62 adjacent the hinge 49 while the hinged plate 57 of the holder 44 is provided with a similar projection 61 adjacent the hinge 58 which projections are adapted to be grasped by the hand for swinging the hinged plates upwardly to facilitate the emplacement of account sheet F and carbon paper K in position on the bottom plates 47 and 56 thereof.

As illustrated in Fig. 7, the support 50 is shown with a voucher L which is swung to a rearward position on the plate 64 in which position the carbon areas 65 are shown uppermost. The voucher L is adapted to be swung to the position shown in broken line on the account sheet F which is also shown in broken line in Fig. 7 of the drawings.

What is claimed is:

1. In a device for holding record forms for simultaneous entry, a support for a record form, a bar extending transversely of said support, a slide having a groove in the under side thereof for receiving said bar for mounting the slide thereon for movement longitudinally of said bar, superimposed plates fixed and hinged to said slide respectively for movement with said slide to dispose the plates in various positions on the face of a record form arranged on said support, said hinged plate being adapted to swing upwardly for positioning a sheet of carbon paper and another record form between said plates and in superimposed relation on said fixed plate with the upper portions of said carbon paper and record form extending beyond said plates into overlying relation with said first mentioned record form, a second slide adapted to receive smaller record forms having carboned areas on the under side thereof, and interengaging means carried by said slides for guidedly mounting said last mentioned slide for movement toward and away from said plates for disposing said smaller record forms in various positions on the projecting portions of the record form secured between said plates.

2. In a device for holding record forms for simultaneous entry, a support adapted for receiving a record form thereon, a bar extending transversely of said support and projecting beyond one edge thereof, a slide, interengaging means carried by said slide and said bar for mounting the slide on said bar for movement longitudinally thereof, a plate rigidly affixed to said slide, an upper plate arranged in superimposed relation on said fixed plate and hinged to said slide, said hinged plate being adapted to swing upwardly for positioning a sheet of carbon paper and another record form between the said plates with the upper portions of said carbon paper and said record form extending beyond said plates and in overlying relation with a record form on said support, a second slide arranged on said first mentioned slide for movement toward and away from said plates and adapted to receive smaller record forms for disposing the same in various positions on the projecting portions of the record form secured between said plates.

3. In a device for holding record forms for simultaneous entry, a support adapted for receiving a record form thereon, a bar extending transversely of said support and projecting beyond one edge thereof, a slide guidedly arranged on said bar for movement longitudinally thereof, an outwardly extending plate rigidly affixed to said slide, a plate hinged to said slide and normally tensioned against said fixed plate and adapted to be swung upwardly for positioning a sheet of carbon paper and another record form between said plates with the upper portions of said carbon paper and said record form projecting beyond said plates into overlying relation with a record form arranged on said support, a second slide guidedly arranged on said first mentioned slide for movement toward and away from said plates, and spring pressed fingers carried by said second slide adapted to receive thereon smaller record forms having carboned areas on the under side thereof for disposing the same in various positions on the projecting portion of the record form secured between said plates.

4. In a device for holding record forms for simultaneous entry, a pair of parallel bars, inwardly directed trunnions carried by one of said bars adapted to engage in openings in opposite edges of a binder for record forms, a slide guidedly arranged on the other bar for movement of said slide longitudinally of the bar over an edge portion of a record form arranged in said binder, a plate rigidly affixed to said slide to project outwardly therefrom, an upper plate arranged in superimposed relation on said fixed plate and hinged to said slide, said hinged plate being adapted to swing upwardly for positioning a sheet of carbon paper and another record form between said plates with the upper portions of said carbon paper and record form extending beyond said plates and in overlying relation with the record form in said binder, a second slide adapted to receive smaller record forms and arranged on said first mentioned slide for movement toward and away from said plates for disposing said smaller record forms in various positions on the projecting portions of the record form held between said plates.

5. In a device for holding record forms for simultaneous entry, a support adapted for receiving a record form thereon, means mounting a pair of slides adjacent opposite edges of said support for sliding movement thereon, a pair of superimposed plates secured to each of said slides and arranged therebetween, the lower plates of each pair being rigidly affixed to the slides respectively and the upper plates of each pair being hinged thereto for swinging movement adapted to permit of a sheet of carbon paper and a record form being arranged on said fixed plates with the upper portions of said carbon paper and record form extending beyond said plates and in overlying relation with a record form on said support, and said fixed plates having interengaging tongue and recess for retaining said fixed plates in engagement for conjoint movement of said slides.

6. In a device for holding record forms for simultaneous entry, a support adapted for receiving a record form thereon, means mounting a pair of slides adjacent opposite edges of said support for sliding movement thereon, a pair of superimposed plates secured to each of said slides and arranged therebetween, the lower plates of each pair being rigidly affixed to the slides respectively and the upper plates of each pair being hinged thereto for swinging movement adapted to permit of a sheet of carbon paper and a record form being arranged between said fixed and hinged plates with the upper portions of said carbon paper and record form extending beyond said plates and in overlying relation with a record form on said support, said fixed plates having interengaging means for retaining the same in engagement for conjoint movement of said slides, and a slide arranged on one of the aforementioned slides for movement toward and away from said plates and adapted to receive small record forms for disposing the same in various positions on the projecting portion of the record form held between said plates.

7. In a device for holding record forms for simultaneous entry, a support adapted for receiving a record form thereon, means mounting a pair of slides adjacent opposite edges of said support for sliding movement thereon, a pair of superimposed plates secured to each of said slides and arranged therebetween, the lower plates of each pair being rigidly affixed to the slides respectively and the upper plates of each pair being hinged thereto for swinging movement adapted to permit of a sheet of carbon paper and a record form being arranged between said fixed and hinged plates with the upper portions of said carbon paper and record form extending beyond said plates and in overlying relation with a record form on said support, said fixed plates having interengaging means for retaining the same in engagement for conjoint movement of said slides, a slide guidedly arranged on one of said above mentioned slides for movement toward and away from said plates, and means carried by said last mentioned slide adapted to receive smaller record forms for movement with said last mentioned slide for disposing the same in various positions on the projecting portion of the record form secured between said plates.

LEIF OLSEN-TANK.

REFERENCES CITED

The following references are of record in the file of this patent:

UNITED STATES PATENTS

| Number | Name | Date |
|---|---|---|
| 1,791,671 | Herschel | Feb. 10, 1931 |
| 2,163,193 | Critchfield | June 20, 1939 |

FOREIGN PATENTS

| Number | Country | Date |
|---|---|---|
| 121,832 | Switzerland | Aug. 16, 1927 |
| 601,106 | Germany | Aug. 8, 1934 |
| 671,905 | Germany | Feb. 16, 1939 |